(12) United States Patent
Takayama

(10) Patent No.: US 6,587,812 B1
(45) Date of Patent: Jul. 1, 2003

(54) METHOD AND SYSTEM FOR MONITORING INDUSTRIAL MACHINE

(75) Inventor: Yukiyoshi Takayama, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/472,244

(22) Filed: Dec. 27, 1999

(30) Foreign Application Priority Data

Jan. 27, 1999 (JP) .......................................... 11-018082

(51) Int. Cl.⁷ .......................... G06F 19/00; G06F 11/30
(52) U.S. Cl. .................... 702/182; 702/67; 702/184; 702/185
(58) Field of Search .................... 702/182, 183, 702/184, 185, 186, 187, 188, 34, 35, 56, 66–67, 71; 700/159, 174, 177, 180

(56) References Cited

U.S. PATENT DOCUMENTS

| 4,424,709 A | * | 1/1984 | Meier, Jr. et al. ........... 73/117.3 |
| 5,067,099 A | * | 11/1991 | McCown et al. ........... 702/183 |
| 5,210,704 A | * | 5/1993 | Husseiny ..................... 702/34 |
| 5,566,092 A | * | 10/1996 | Wang et al. ................. 702/185 |
| 6,195,617 B1 | * | 2/2001 | Miller ........................ 702/125 |
| 6,229,536 B1 | * | 5/2001 | Alexander et al. .......... 345/340 |

FOREIGN PATENT DOCUMENTS

| JP | 3-137518 | 6/1991 |
| JP | 3-154846 | 7/1991 |
| JP | 3-154847 | 7/1991 |
| JP | 4-113051 | 10/1992 |
| JP | 4-361814 | 12/1992 |
| JP | 5-200658 | 8/1993 |

OTHER PUBLICATIONS

Omega, Data Acquisition System Handbook, vol 29, 1995; Pages Sections F.117, B15, B16, B17.*

* cited by examiner

Primary Examiner—Bryan Bui
(74) Attorney, Agent, or Firm—Armstrong, Westerman & Hattori, LLP

(57) ABSTRACT

The condition of each of machines on dispersed lines can be quantitatively grasped before an error occurs, without going to the machine installation site, so that the efficiency of machine fault diagnosis can be improved. One server terminal for diagnosis is provided for each factory at the use side. As clients for this server terminal, a press controller, a workpiece conveyor control motion controller, and a line production management computer are connected through an Ethernet. The server terminal is connected via modem and telephone line to a diagnosis terminal with a modem which is installed at the maker side. The operating condition of a press is measured and recorded as continuous time-series waveform data, using an analog input card. The recorded waveform data is processed to be graphically displayed on the diagnosis terminal, etc.

10 Claims, 13 Drawing Sheets

FIG. 2 AN EXAMPLE OF THE DIAL-UP CONNECTION SCREEN

AN EXAMPLE OF THE LINE NUMBER SELECTION SCREEN

FIG. 7 AN EXAMPLE OF THE FREQUENCY ANALYSIS SCREEN

FIG. 8 AN EXAMPLE OF THE STORED FREQUENCY ANALYSIS WAVEFORM SCREEN

FIG. 10

AN EXAMPLE OF THE HISTORY INFORMATION SCREEN
IN THE EVENT OF CONVEYOR ABNORMALITY

| 1.CTROOLINE (C:\komatsu\Iff\Client\Log\Fault\test) | | | | | | | | ☒ |
|---|---|---|---|---|---|---|---|---|
| TIME: -7.50 (sec) | | PRESENT VALUE: 0.000 | | | | SPEED: | | 0.000 |
| | | Actual Positon (PRESENT VALUE) | | | | | | |
| #1: 4.960 | #2: 699.995 | #3: 699.590 | #4: 699.996 | #5: 749.981 | #6: 750.003 | #7: 749.993 | #8: 0.000 | |
| | | Following Error (DELAY IN SYNCHRONIZATION) | | | | | | |
| #1: 0.000 | #2: 0.000 | #3: 0.000 | #4: 0.000 | #5: 0.000 | #6: 0.000 | #7: 0.000 | #8: 0.000 | |
| | | Following Error MAX (MAXIMUM DELAY IN SYNCHRONIZATION) | | | | | | |
| #1: 0.000 | #2: 0.000 | #3: 0.000 | #4: 0.000 | #5: 0.000 | #6: 0.000 | #7: 0.000 | #8: 0.000 | |
| | | Twist Error (DEVIATION BETWEEN SHAFTS) | | | | | | |
| | #1 | #2 | #3 | #4 | #5 | #6 | #7 | #8 |
| #1 | | 0.000 | 0.000 | 0.000 | 0.000 | 0.000 | 0.000 | 0.000 |
| #2 | | | 0.405 | 0.000 | 0.000 | 0.000 | 0.000 | 0.000 |
| #3 | | | | -0.406 | 0.000 | 0.000 | 0.000 | 0.000 |
| #4 | | | | | 0.000 | 0.000 | 0.000 | 0.000 |
| #5 | | | | | | -0.022 | -0.012 | 0.000 |
| #6 | | | | | | | 0.010 | 0.000 |
| #7 | | | | | | | | 0.000 |
| #8 | | | | | | | | |
| NUMBER OF ERRORS: 5 | | | | | CS1:0x00000000 | CS2:0x00000000 | CS3:0x00000000 | |
| | File Select | | < Prev | Next > | | Error List | Close | |

20  21

METHOD AND SYSTEM FOR MONITORING INDUSTRIAL MACHINE

TECHNICAL FIELD

The present invention relates to a method and system for monitoring the operating condition of industrial machines such as large-sized presses and machine tools.

BACKGROUND ART

Since an industrial machine such as a large-sized press used in production lines for various types of molded articles is placed in the most upstream position of a line, if a failure occurs in the industrial machine, the whole line will be stopped, resulting in great loss. Recently, due to the increasing demands for better performance and improved man-machine interface, mechatronization proceeds rapidly and more and more so-called "black box" parts are incorporated in such an industrial machine. Under such a situation, maintenance requires various knowledge and experience and, in fact, maintenance staff on a user side can no longer cope with. Therefore, it becomes essential for makers to establish a prompt maintenance support system for troubleshooting. In particular, the development of a system, which enables preventive maintenance with accurate acquisition of machine conditions from a remote point, is long waited.

The following techniques are known as prior art associated with machine fault diagnosis.

(1) Japanese Patent Publication (KOKAI) Gazette No. 3-154846 (1991)

The technique disclosed in this publication relates to a fault-diagnostic system for finding the cause of a fault if a target for control in a sequence control system has failed. In this system, question and answer selection is done in a dialog form, with the aid of a fault tree to identify the cause of a trouble and indicate a way of repairing.

(2) Japanese Utility Model Publication (KOKAI) Gazette No. 4-113051(1992)

This technique is associated with a system for diagnosing a failure occurring in a machine based on detection of electrically detectable physical phenomena such as sound, vibration, and heat generated during machine operation. In this system, the difference between detection values obtained at two detecting positions in a machine is calculated and if the difference exceeds a preset value, it is then determined that a failure has occurred.

(3) Japanese Patent Publication (KOKAI) Gazette No. 4-361814 (1992)

This relates to looseness diagnostics, elongation characteristics diagnostics, and abnormality diagnostics for judgement on leveling, these diagnostics being adapted in a rolling system such as a rolling machine.

According to this technique, the displacement of bearing boxes for upper and lower work rolls is measured and the elongation characteristics and abnormal condition of the rolling system are diagnosed based on changes in the fluctuating waveform of the displacement of the bearing boxes relative to time.

(4) Japanese Patent Publication (KOKAI) Gazette No. 5-200658 (1993)

This relates to a production management system for analyzing the cause of a trouble which occurred in a system having a plurality of processing machines connected via a communication network. This system is designed such that each terminal unit connected to the communication network has a processing machine fault diagnostic section and a self diagnostic section.

These techniques, however, have revealed their inherent problems. Concretely, although the technique (1) is effective in finding the cause of a failure when an abnormality has occurred, it cannot preliminary detect a symptom before occurrence of an abnormality. The technique (2) is disadvantageous in that it makes erroneous detection when a noise is included in a sensor for obtaining a detection value since fault judgement done by this technique is based on information related to a certain point on a time axis. In addition, it is difficult for the technique (2) to make a judgement without data on positions before and after a detection point. The technique (3) has the disadvantage that since it is intended for use in rolling systems such as rolling machines, it is not applicable to systems which grasp, at one location, the respective conditions of industrial machines located on a plurality of lines. Lastly, the technique (4) is dependent on ON/OFF information as to whether or not each of dispersed machines is in operation and therefore cannot observe the condition of each machine in real time before a machine trouble occurs.

The present invention is directed to overcoming the foregoing problems and one of the objects of the invention is therefore to provide a method and system for monitoring an industrial machine, which enables it to quantitatively grasp the conditions of machines on dispersed lines before occurrence of an abnormality without going to the installation location of each machine so that the efficiency of machine fault diagnosis can be improved.

DISCLOSURE OF THE INVENTION

The above object can be accomplished by a method for monitoring an industrial machine according to a first aspect of the invention, in which the operating condition of an industrial machine is measured and recorded as continuous time-series waveform data and this waveform data is processed to be graphically displayed on the screen of a terminal unit.

According to the invention, before an abnormality occurs, the condition of a machine is recorded as continuous time-series waveform data, that is, a packet of time-series data and the recorded data is displayed on the screen of a terminal unit, so that the condition of each of the machines on dispersed lines can be quantitatively grasped at first sight from the screen and the point which requires maintenance and a way of maintenance can be properly instructed judging from the trend of changes in the waveform. In addition, since the condition of each machine can be monitored without going to the installing location of each machine, the efficiency of machine condition diagnosis can be improved and downtime due to a machine failure can be reduced.

In the invention, the recorded waveform data is preferably displayed on a terminal unit located at a remote point via a communication line. With this arrangement, the maker can provide the user with a prompt maintenance support service and proper recommendations as to maintenance positions and maintenance periods, after delivery of the machines to the user.

The invention is preferably arranged such that the normal condition of an industrial machine is preliminarily recorded as continuous time-series waveform data and can be graphically displayed on the screen of the terminal unit. Therefore, waveform data obtained under a certain operating condition can be compared to the waveform data of the normal condition to grasp the trend of the waveform data of the certain operating condition. In this way, from the result of the comparison between the waveforms of the normal condition and the present operating condition, information on machine fault diagnosis can be observed before occurrence of a failure in the machine, which enables more accurate condition diagnosis.

In this case, it is preferable to allow switching from a presently displayed screen to a diagnosis guidance screen which is used for diagnosing the abnormal condition of the industrial machine, based on the result of a comparison between the waveform data of the normal condition and the waveform data of a certain operating condition. Further, it is preferable that a presently displayed screen be switched from the diagnosis guidance screen to a screen which designates a point where a failure has occurred. This facilitates judgement on the cause of a failure and a way of tackling the failure so that there is no need to individually investigate each maintenance point but only the designated point may be investigated. This significantly reduces investigating time and maintenance time.

According to a second aspect of the invention, there is provided a system for monitoring an industrial machine, which comprises measuring means for measuring the operating condition of an industrial machine, recording means for recording data obtained from measurement by the measuring means as continuous time-series waveform data, and displaying means for processing and graphically displaying the waveform data recorded by the recording means.

The second aspect of the invention is associated with a monitoring system intended for use with the industrial machine monitoring method of the first aspect of the invention and has the same effects as those attained by the method of the first aspect.

The monitoring system of the invention preferably includes transmitting means for transmitting the recorded waveform data to a terminal unit located at a remote point via a communication line to display it on the terminal unit. In this case, the displaying means is preferably designed such that the normal condition of an industrial machine can be preliminarily recorded as continuous time-series waveform data and graphically displayed on the screen of the terminal unit, and waveform data obtained under a certain operating condition can be compared to the waveform data of the normal condition to grasp the trend of the waveform data of the certain operating condition. From the result of the comparison between the waveforms of the normal condition and the certain operating condition, a diagnostic guidance, which indicates the cause of a failure and a way of tackling it, can be displayed.

BRIEF EXPLANATION OF THE DRAWINGS

FIG. 10 is a diagram showing an example of the history information screen in the event of occurrence of conveyor abnormality.

BEST MODE FOR CARRYING OUT THE INVENTION

Referring now to the accompanying drawings, a method and system for monitoring an industrial machine will be described according to a preferred embodiment of the invention.

Figure 1:
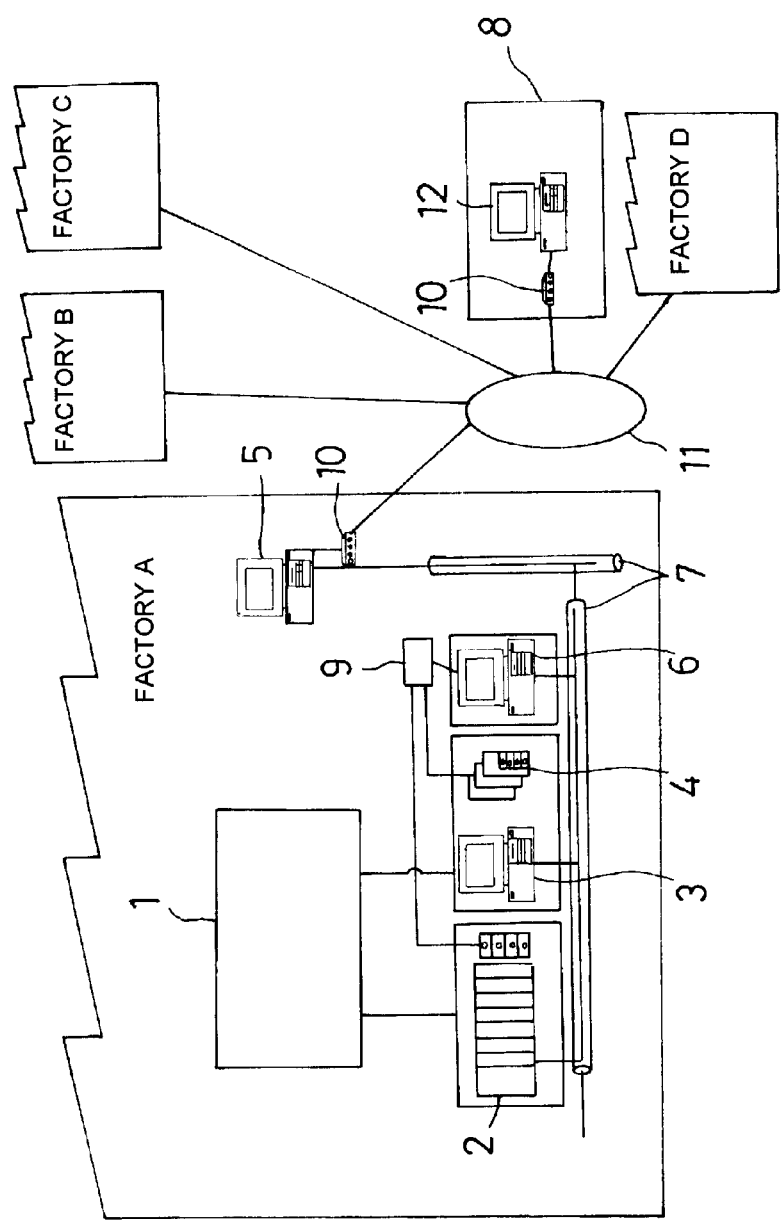
FIG. 1 is a diagram showing a system configuration of an industrial machine monitoring system constructed according to one embodiment of the invention.

FIG. 1 shows a system configuration of a monitoring system constructed according to one embodiment of the invention when it is applied to a large-sized press.

In the system of this embodiment, there are provided a plurality of production lines in each of factories A, B and C. Each line is provided with a large-sized transfer press (hereinafter simply referred to as "press") 1. Each press 1 comprises a press body composed of work stations for press-molding workpieces and a workpiece conveyor disposed within the press body for conveying workpieces in a feeding direction.

The press 1 is controlled to be operated and stopped by a sequencer (press controller) 2 for press control. Servo motors for the workpiece conveyor are controlled by a workpiece conveyor control motion controller 3 through servo drivers 4 so that the position, speed, etc. of the workpiece conveyor are controlled, the motion controller 3 serving as a sub controller of the press controller 2.

In each of the factories A, B and C, a server terminal 5 for use in diagnosis is provided. As clients of the server terminal 5, the press controller 2, the workpiece conveyor control motion controller 3 and a line production management computer 6 are connected with the aid of an Ethernet 7. By way of the server terminal 5, information from each line is transmitted to outside (the maker side of the press 1) 8 and reversely, a client such as the press controller 2 can be accessed from the maker side 8. The line production management computer 6 provided for each line is a terminal for collecting necessary real-time data such as the vibration and current state of the press 1. This terminal is provided with a board into which an analog input card 9 for inputting analog data (described later) and an Ethernet card (not shown) for connection with the server terminal 5 can be inserted.

Figure 2:
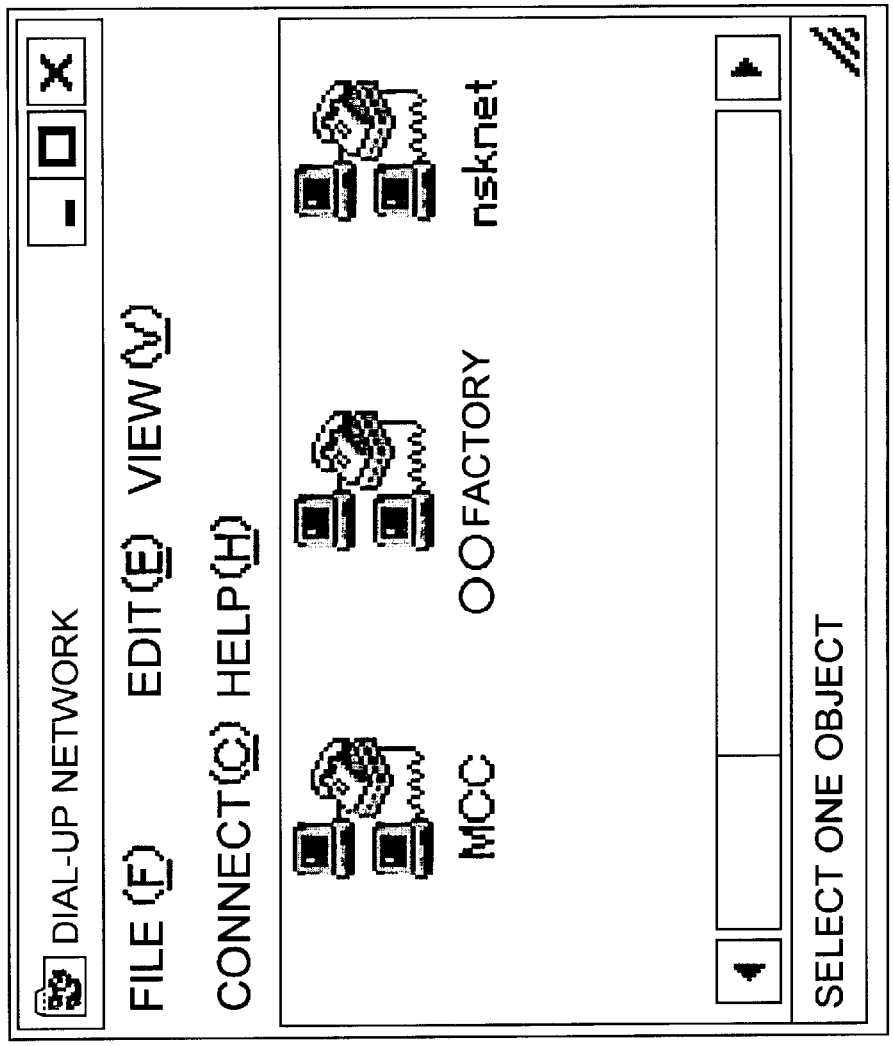
FIG. 2 is a diagram showing an example of the dial-up connection screen.
Figure 3:
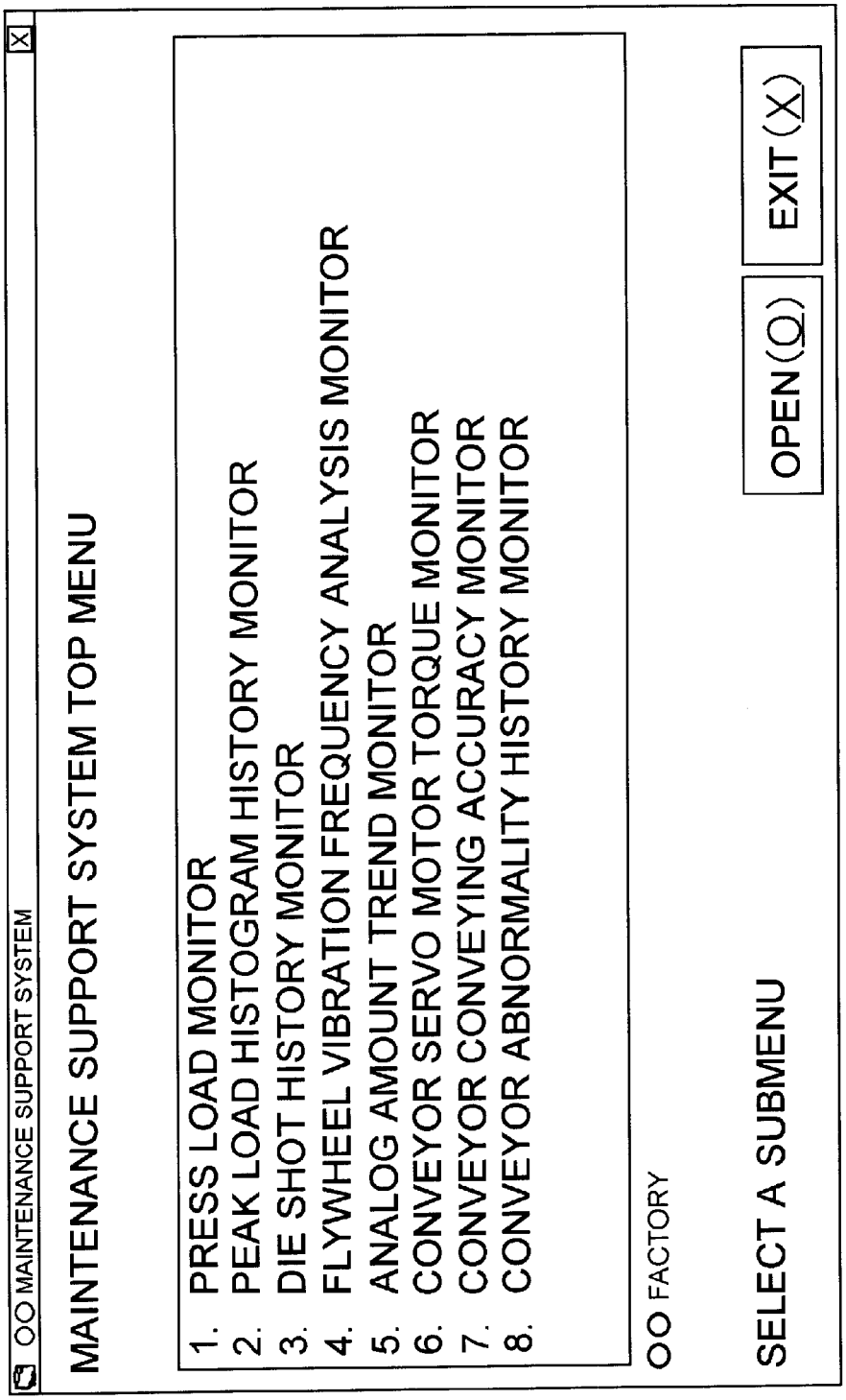
FIG. 3 is a diagram showing an example of the monitor item selection screen.
Figure 4:
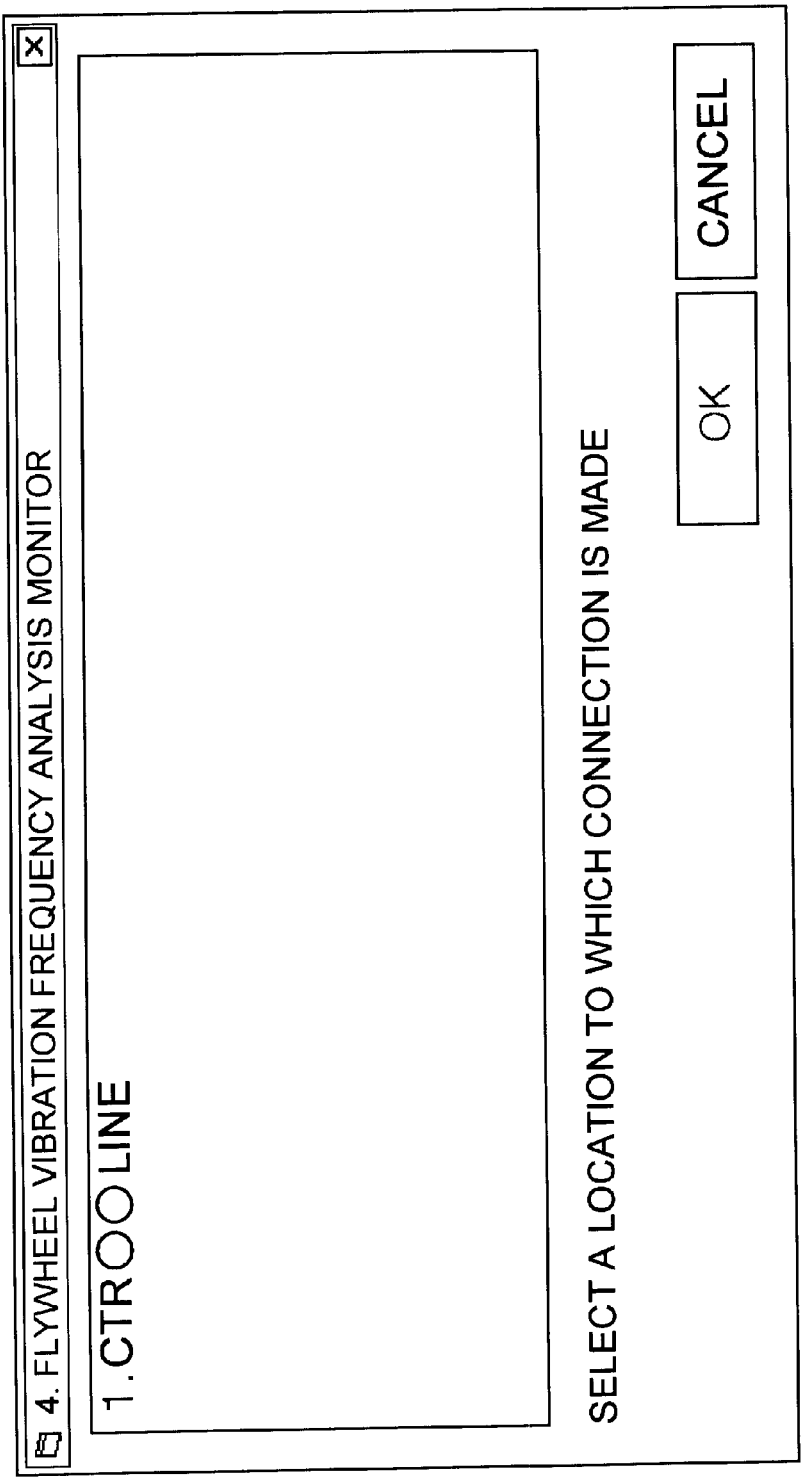
FIG. 4 is a diagram showing an example of the line number selection screen.

The server terminal 5 can be connected to a diagnostic terminal 12 equipped with a modem 10 which is installed at the maker side 8 via a modem 10 and a telephone line 11. Thus, a dial-up PPP connection can be made from the diagnostic terminal 12 to the server terminal 5 through the telephone line 11, thereby to log into each client such as the press controller 2 and the workpiece conveyor control motion controller 3, so that monitoring and adjustment of the system can be done from a remote point. In a basic accessing method, the user logs on the server terminal 5 by telephoning a desired factory to be accessed through a dial-up connection (see FIG. 2). Then, the user selects any one of monitor items in a top menu (see FIG. 3) displayed on the screen of the diagnostic terminal 12, the monitor items including, in this embodiment, press load monitor, peak load histogram history monitor, die shot history monitor, flywheel vibration frequency analysis monitor, analog amount trend monitor, conveyor servo motor torque monitor, conveyor conveying accuracy monitor and conveyor abnormality history monitor. Subsequently, when the line number of the factory to be accessed is inquired (see FIG. 4), the user selects a line number (CTR ○○ line in the present embodiment) thereby starting monitoring. Similar monitoring is possible for the line production management computer 6 in each factory. For connecting the diagnostic terminal 12 to the local network of the dispersedly located factories, the Internet connection, connection via a privately used line or connection via a public telephone line may be set up.

Next, two software programs used in this system will be explained. One of these software programs is an input module program having such a function that measuring conditions such as a channel to be input, data sampling time, the number of data sampling times and trigger conditions as well as measurement start/stop commands are provided by way of the network; information from each sensor is taken in via the analog input card 9 under the condition specified by a measurement start signal; and the data train thus taken in is transmitted to the terminal which has requested to make a measurement. This program is actuated by other terminals on the network. The other software is a display module program which has a man-machine interface for inputting measuring conditions such as the name of a line to be measured, a channel to be input, data sampling time, the number of data sampling times and trigger conditions. These measuring conditions are transferred by way of the network together with an input module start command. The measurement data trains from the input module program are displayed as a waveform on a terminal screen.

The input module program is set in the line production management computer 6 while the display module program is set in the diagnostic terminal 12. It should be noted that if a diagnosis is required to be made on a line in a factory, both of the input module program and the display module program may be set in the line production management computer 6.

With the above arrangement, measurement information from the sensor (measuring means) provided at each position in the press 1 is taken in by the line production management computer 6 via the analog input card (recording means) 9 as one packet of waveform data continuing on a time axis, and this taken-in data is transmitted to the diagnostic terminal 12 via the network, so that the data displayed by the display module of the diagnostic terminal 12 takes a form of continuous waveform data. In addition, the display module has the functions of displaying present waveform data and storing it in a file and displaying a waveform previously recorded, and therefore it is possible to compare the present waveform to the previous waveform by displaying the previous one in a window while monitoring the present waveform. It should be understood that when transmitting waveform data, all data on the time axis cannot be transmitted as a matter of course, because of time delays in the network, but it is possible to transmit continuous data sufficient to make a fault diagnosis.

Figure 5:
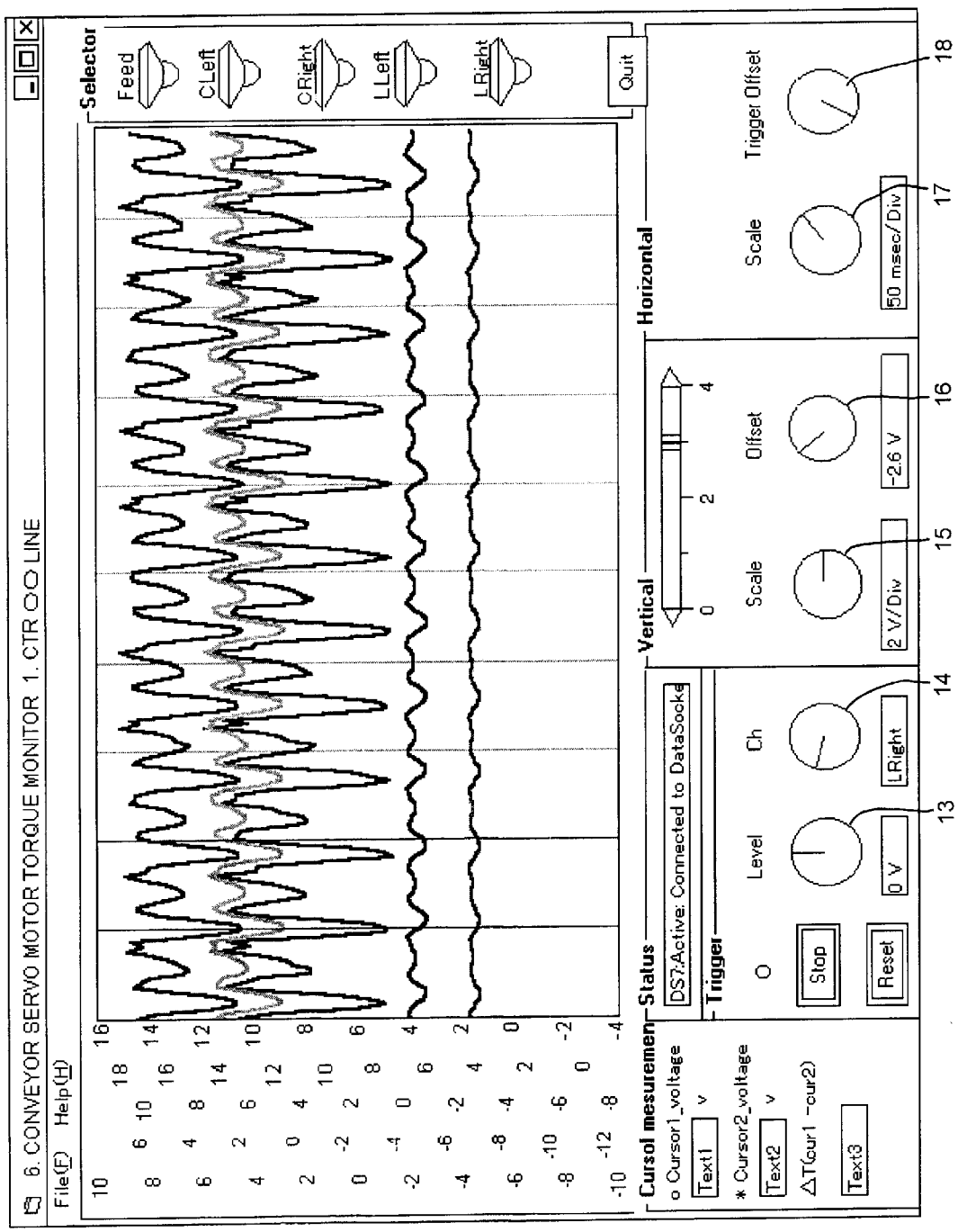
FIG. 5 is a diagram showing an example of the oscilloscope screen.
Figure 6:
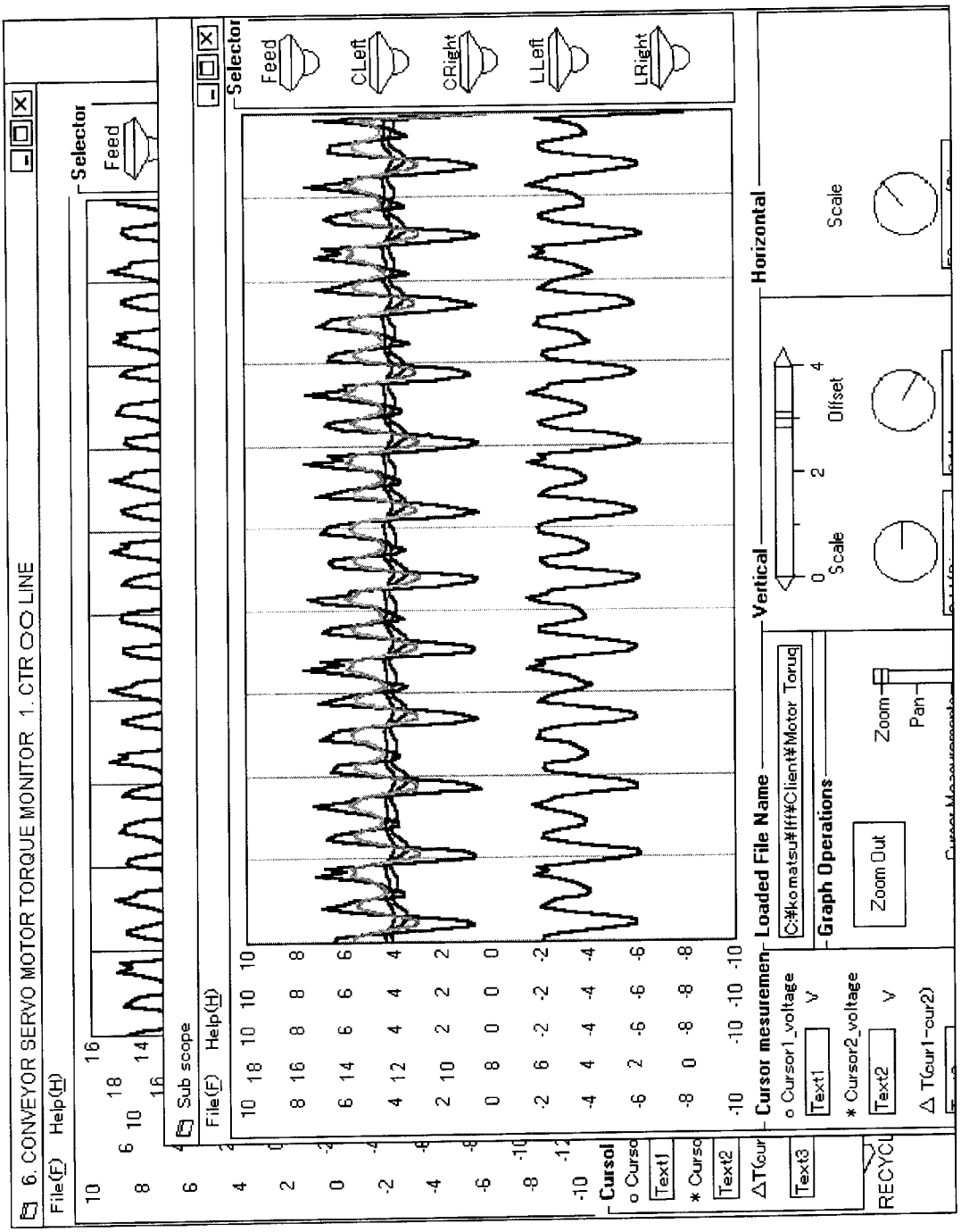
FIG. 6 is a diagram showing an example of the stored oscilloscope waveform screen.

Now, a basic software program for diagnosis for the press 1 will be described. This basic software mainly comprises the following packages.
(1) Oscilloscope function
(2) Frequency analysis function
(3) Data logger function
(4) File transmission function
(5) Conveyor accuracy monitoring function
(6) Ladder program console function
(7) Maintenance support on-line manual Next, each software function will be outlined.
(1) Oscilloscope function An oscilloscope is used when observing a signal from the sensor in real time as a waveform. Concretely, it is used for monitoring the vibration waveform of the machine, a servo motor current and speed waveform, and the load waveform of the press. FIG. 5 shows one example of the oscilloscope screen associated with a conveyor servo torque monitor. This oscilloscope has a basic function similar to that of a general-purpose oscilloscope but its feature resides in that a waveform previously measured can be stored; this stored waveform is read out (see FIG. 6) to be compared with a present waveform; and a jump to an on-line manual (described later) can be made to determine a maintenance point from a change in waveform. Reading-in etc. of values from a measured waveform can be done by zooming, panning or by use of a cursor. Display channel selection and waveform shifting are also possible.

The principle of monitoring from a remote point is as follows: When activating the data take-in driver of the analog input card 9 into which the desired data is coming in, designating a data sending destination (which is the server terminal 5 in the case of a remote point) as an argument, the data take-in driver transmits data corresponding to a specified number of sampling times as one packet. Thus, the incoming data is displayed on the terminal at the activation end, i.e., the location that originated activation. Therefore, even if there is a time delay in the communication, the sampled data will be continuous. Note that trigger conditions, start/stop, the ranges of the horizontal/vertical axes etc. can be altered by use of buttons 13, 14, 15, 16, 17 and 18 (see FIG. 5).

(2) Frequency analysis function

Figure 7:
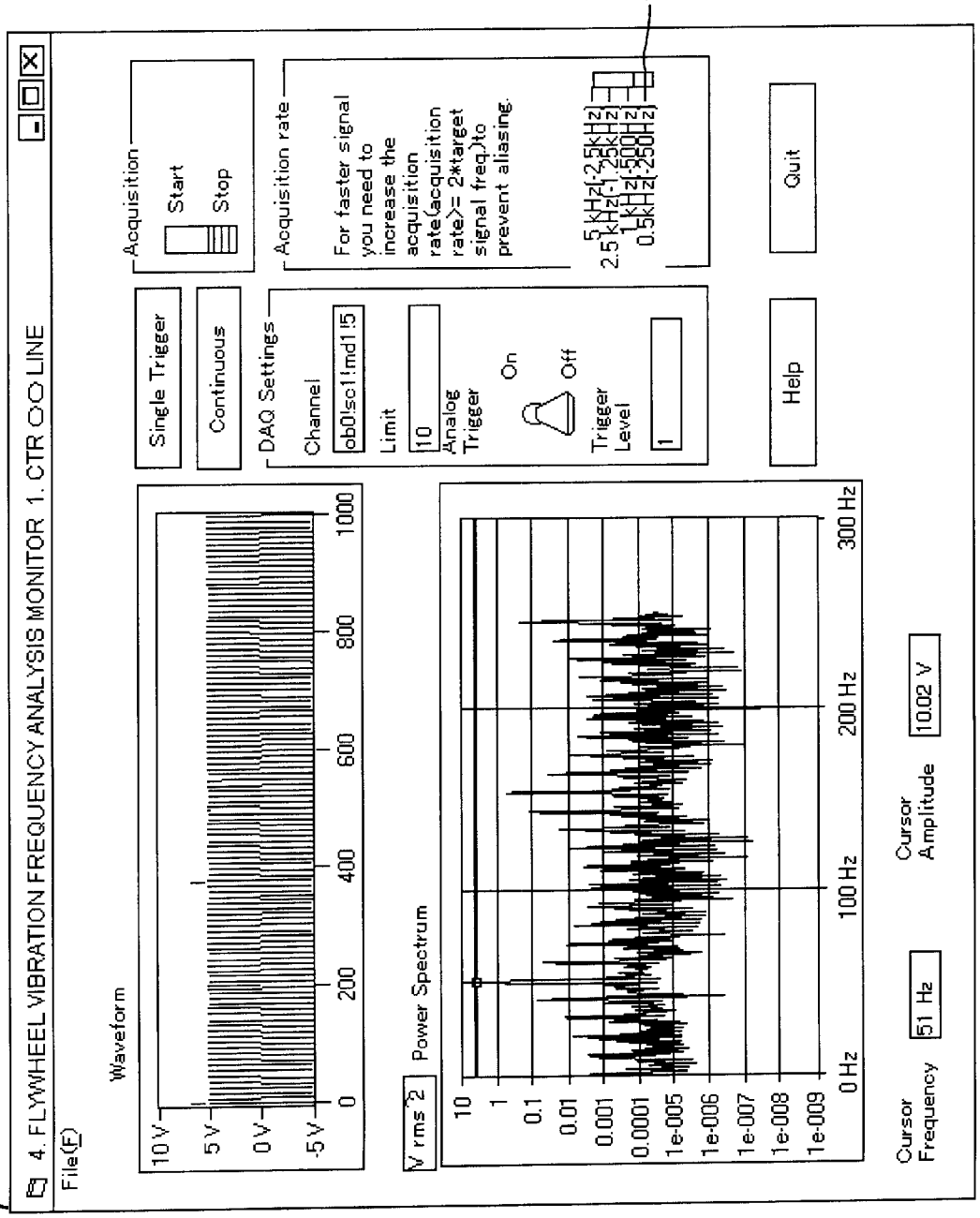
FIG. 7 is a diagram showing an example of the frequency analysis screen.
Figure 8:
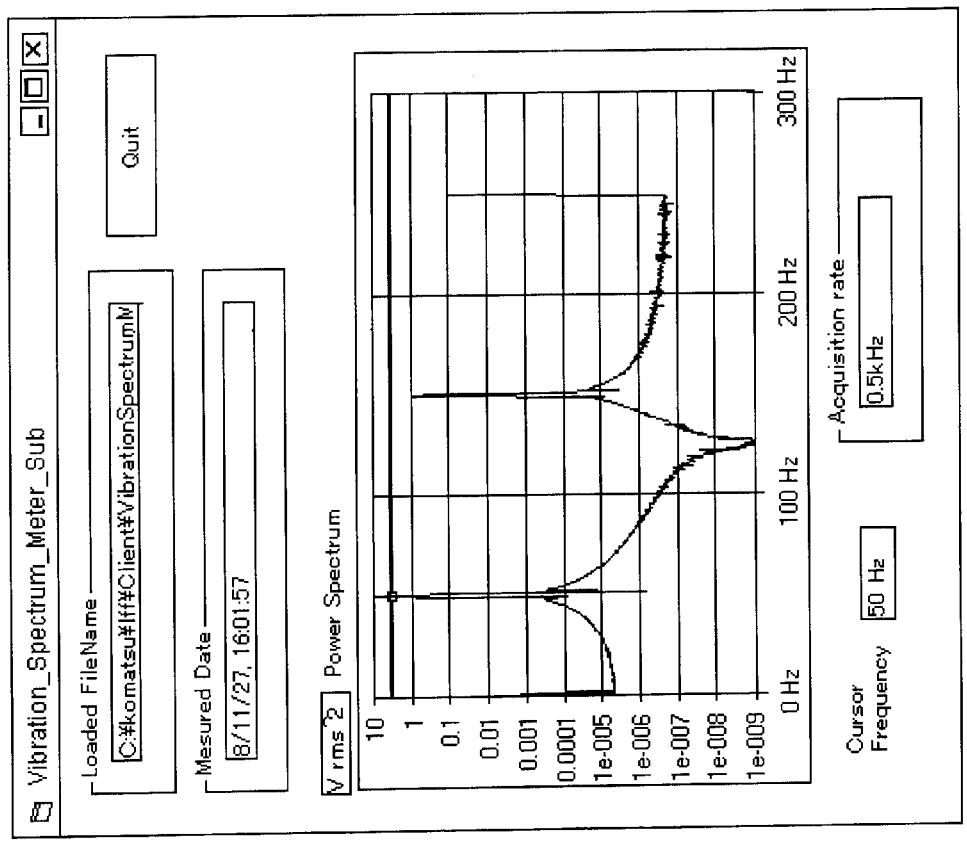
FIG. 8 is a diagram showing an example of the stored frequency analysis waveform screen.

The frequency analysis function is the function of frequency-analyzing a signal from a vibration sensor to display a frequency spectrum. This function is used for monitoring symptoms of an abnormal condition of a bearing or machine driving system. FIG. 7 shows one example of the frequency analysis screen. In this screen, the upper part of the screen represents a raw waveform of vibration while the lower part of the screen represents a frequency spectrum of a vibration waveform. The peak frequency of the spectrum is found by measurement with a cursor. The scan rate can be varied by use of a button 19 at four stages according to analyzed frequency regions. The data which has been obtained from measurement for trend management can be stored in a file and called to be used in a trend comparison between the called data and present data. FIG. 8 shows an example of the stored waveform screen. Similarly to the oscilloscope function, this function can be used in a remote place.

(3) Data logger function

Figure 9:
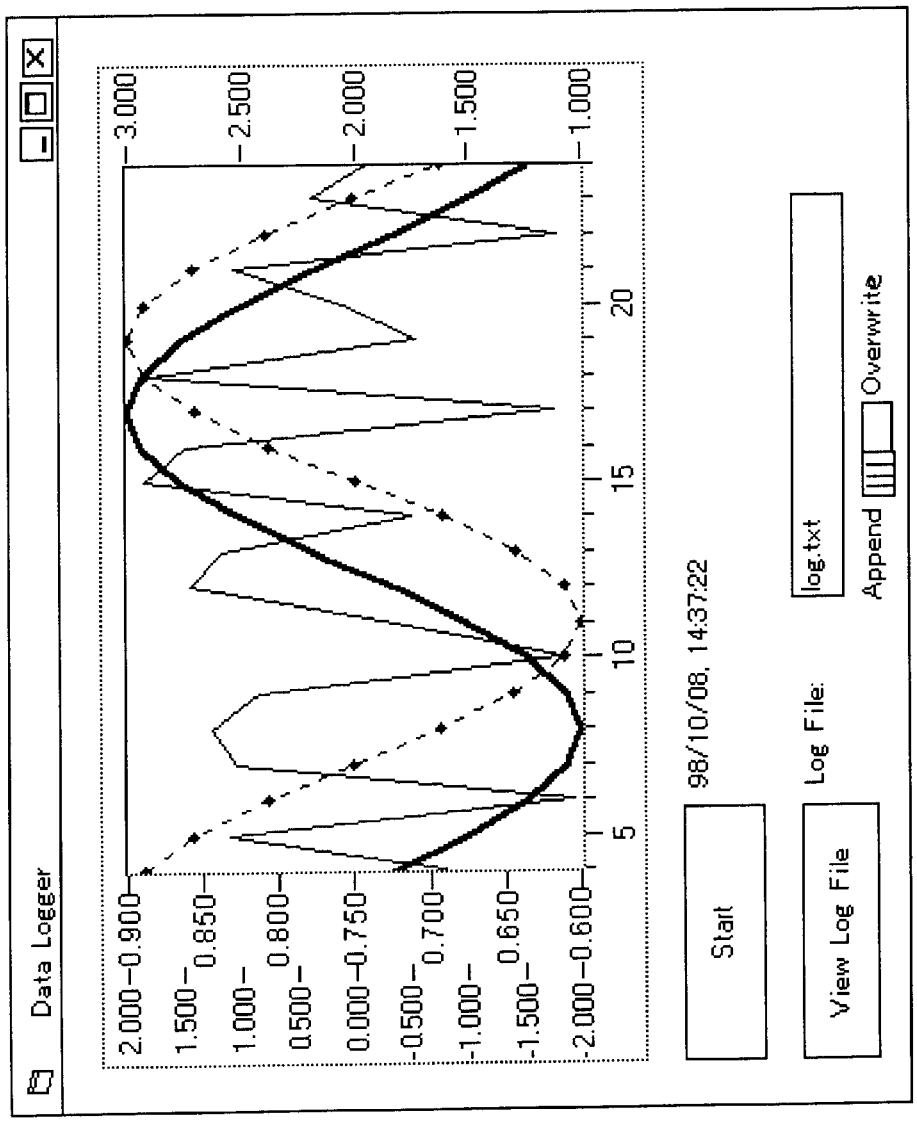
FIG. 9 is a diagram showing an example of the data logger screen.

While the oscilloscope function and the frequency analysis function are for monitoring data which are required to be obtained in real time so that additional provision of a sensor and an analog input card etc. is necessary for monitoring, the data logger function monitors data via a sequencer so that it can display any information which has been taken in via a sequencer without addition of a sensor. However, it is preferable to use this function in monitoring information such as temperature and pressure which is not necessarily monitored in real time, because data taking-in periods are dependent on the processing time of a sequencer. Concretely, this function may be used, for instance, in predicting occurrence of wear in a bearing from the trend of the temperature of operating parts or in determining the presence or absence of air leaks from the trend of air pressure. FIG. 9 shows one example of the data logger screen. In this screen, the amount of analog data to be displayed (sequencer register number), data collection periods (100 msec. to 24 h) and the number of sampling times are set by setting files. Also, these data can be stored for the purpose of making a comparison between the trends of stored data and particular taken-in data.

(4) Function of transmitting a file of a conveyor abnormality history

The workpiece conveyor is of the servo driven type and interlocked many times for the sake of fail-safety. Therefore, in the event of occurrence of an error, an error message will be displayed. However, if secondary and tertiary errors take place, this could be an obstacle to finding the cause of the primary error. Stored as files in the controller of the servo-type workpiece conveyor are positional data collected during a period of several seconds before and after the occurrence of errors and the occurring order of errors. By reading out such information, it is possible to find how the conveyor behaved during the occurrence of errors and what the primary error was, so that the true cause of a stop in the conveyor can be assumed without being affected and misguided by the secondary and tertiary errors. FIG. 10 shows one example of the history information screen when errors take place in the conveyor. This screen is read out and displayed by FTP file transmission of the history file within the controller. The display of seconds seen at the left top of the screen represents the time elapsed until the occurrence of the first error and the values in the screen represent the present value, a delay, the maximum delay and the amount of deviation between the shafts. These positional data can be varied at an interval of 150 msec. by depressing a Next key 20. Additionally, an error message being presently detected by the workpiece conveyor control motion controller 3 can be seen by depressing an Error List key 21.

(5) Conveyor accuracy monitoring function

Figure 11:
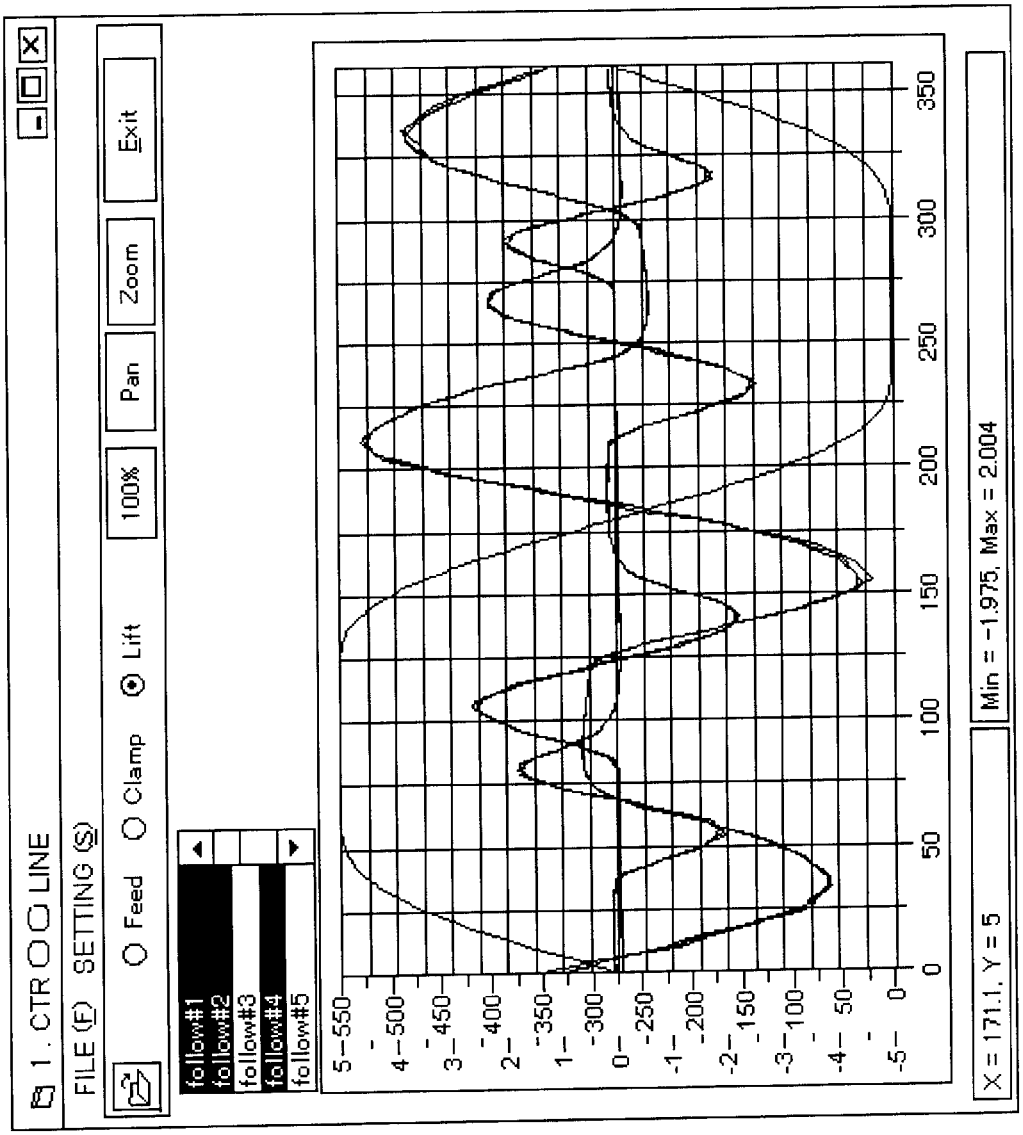
FIG. 11 is a diagram showing an example of the motion accuracy monitor screen.

The workpiece conveyor is of the servo driven type and information on how much the motor deviates from a theoretical trajectory can be obtained by a motion accuracy monitor. This data is periodically monitored and the periodically measured waveform is compared to the waveform obtained at the time of delivery from the factory whereby it is seen that the motor is changing in its condition so that errors in the driving system, encoder system and air balancer system can be predicted. FIG. 11 shows a motion accuracy monitor screen. This screen sends an instruction to the workpiece conveyor control motion controller 3 via the network to make a motion accuracy measurement and receives the result of the measurement as a file to display it. An on-line manual for waveform diagnosis (described later) is displayed by help input on the monitor screen and the details of a maintenance point and maintenance method are displayed by selecting a waveform shape.

(6) Ladder program console function

Figure 12:
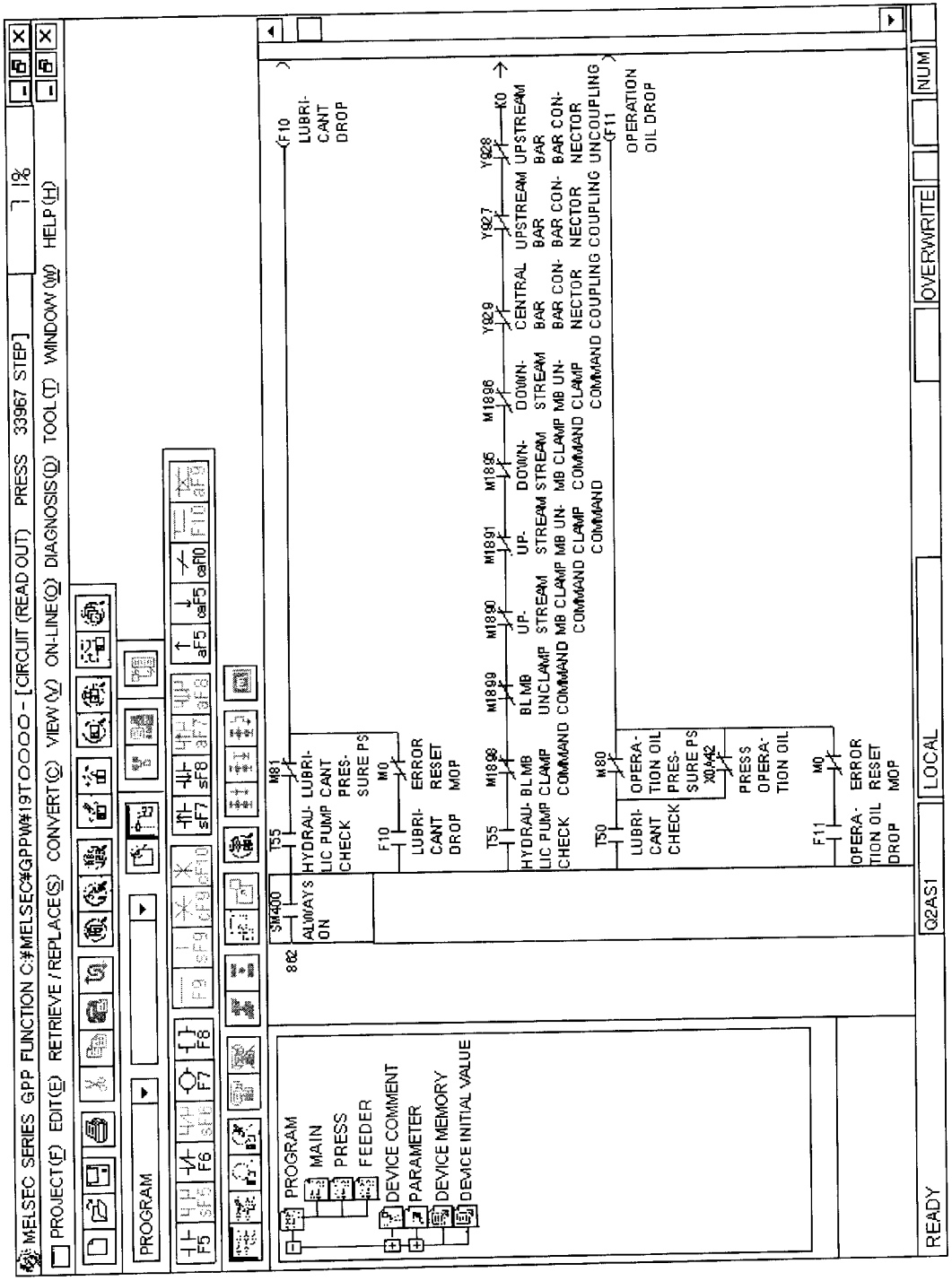
FIG. 12 is a diagram showing an example of the ladder program monitor screen.

A sequencer takes the part of the press controller 2 which serves as the main controller of a large-sized press. Since the complexity of the system is increasing and many interlocks are employed for the sake of fail safety, involving complex cooperative operation, if a certain sensor goes out of order, the interlock for the sensor is halted to continue provisional operation and interlocks which do not appear in an operation guidance are confirmed, using the program console. This function is for confirming interlocks in the event of occurrence of machine errors and for providing a support for an abnormal return process from a remote point in the above case. After a connection is made by the dial-up connection, this function is effected by use of an extension function of a program console soft supplied from a sequencer maker. Therefore, remote monitoring is possible as far as the sequencer is supported by the Ethernet connection of the program console soft. FIG. 12 shows one example of the ladder program monitor screen.

(7) Maintenance support on-line manual

Figure 13:
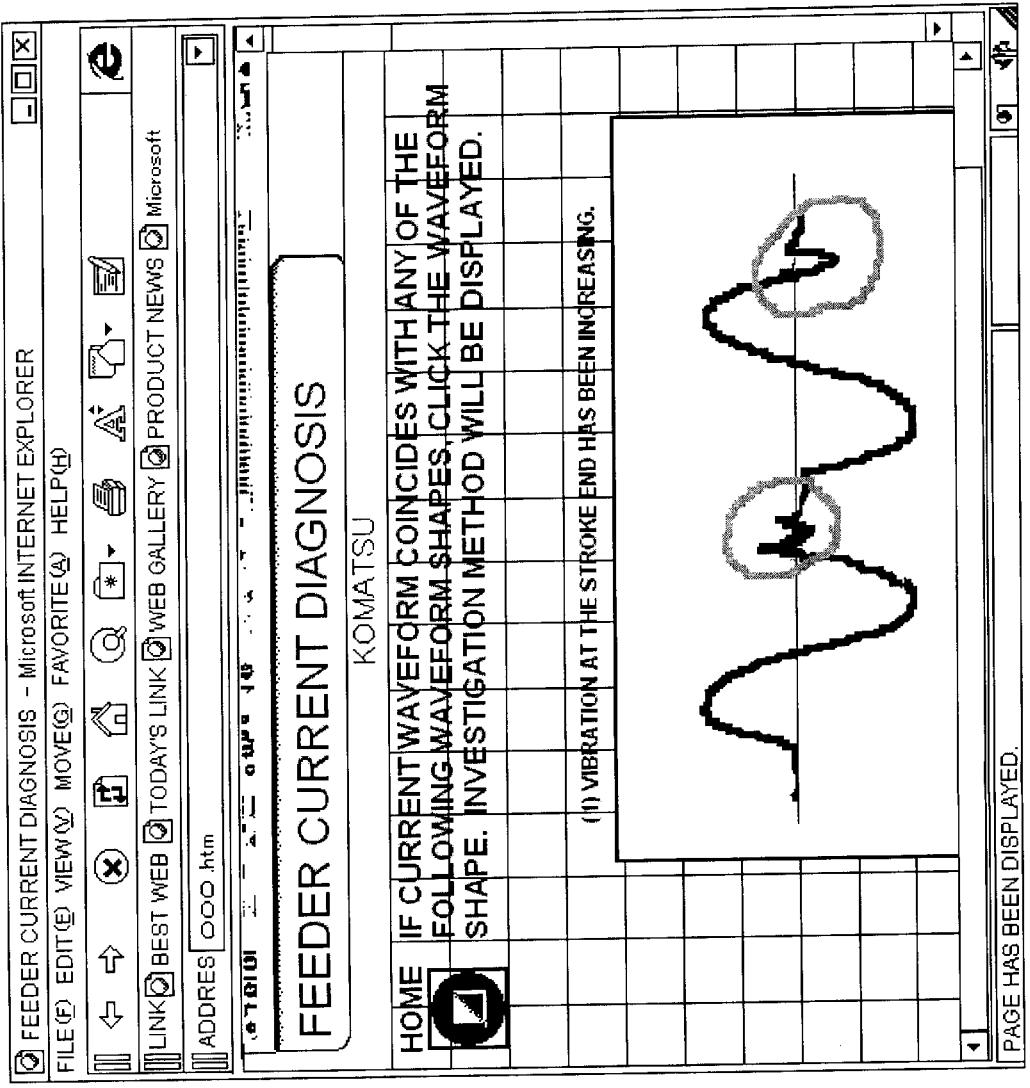
FIG. 13 is a diagram showing an example of the failure point guidance screen.

This function is a guidance manual which indicates a failure point determined from a measured waveform, displaying it on the screen of the workpiece conveyor control motion controller 3. FIG. 13 shows one example of the guidance based on a current waveform of the conveyor. On this screen, waveform shapes are used as keywords for diagnosis so that the cause of a failure and a measure for tackling it will be displayed if a waveform shape on the screen similar to a measured waveform is selected. Therefore, there is no need to individually investigate each maintenance point but only a designated point may be investigated. This reduces investigating time and maintenance time. This manual is stored in the server terminal 5 as a html file and therefore the manual has good maintainability.

Regarding information which is required to be obtained in real time, the present embodiment is arranged such that the condition of a machine is recorded through the analog input card 9 before an error occurs, as a continuous time-series waveform data that is a packet of time-series data, and this recorded data is displayed on the screen of the diagnosis terminal 12 via the telephone line 11. With this arrangement, the condition of each of machines on dispersed lines can be quantitatively grasped at first sight from the screen at a remote point. This leads to not only an improvement in the efficiency of machine diagnosis but also a reduction in downtime due to a machine failure. The trend of waveform changes can be easily obtained by comparison with the waveform obtained when the machine is in a normal condition. In addition, since the cause of a failure and a maintenance method are indicated using a waveform as a key, maintenance time can be reduced.

While the present embodiment has been described with a concept in which the invention is applied to a large-sized press, it should be understood that the invention is applicable to other types of industrial machines such as machine tools.

What is claimed is:

1. A method for monitoring an industrial machine, in which measurement information under an operating condition of an industrial machine obtained from a sensor provided at each position in the industrial machine is recorded as one packet of a continuous time-series waveform data and said waveform data is processed to be graphically displayed on a screen of a terminal unit;

wherein said recorded waveform data is displayed on the terminal unit located at a remote point through a communication line.

2. An industrial machine monitoring method according to claim 1, further comprising a feature that wherein a normal condition of the industrial machine is preliminarily recorded as a continuous time-series waveform data and can be graphically displayed on the screen of the terminal unit, and waveform data obtained under a certain operating condition can be compared to the waveform data of the normal condition to diagnose an abnormal condition of the industrial machine by selecting a waveform shape similar to the waveform data of said certain operating condition from pre-stored waveform shapes as a diagnosis guidance.

3. An industrial machine monitoring method according to claim 2, wherein said presently displayed screen can be switched from said diagnosis guidance screen to a screen which designates a position where a failure has occurred.

4. A system for monitoring an industrial machine, comprising: measuring
- means for measuring an operating condition of an industrial machine,
- recording means for recording data obtained from measurement by the measuring means as one packet of continuous time-series waveform data, and
- displaying means for processing graphically displaying the waveform data recorded by the recording means;
- transmitting means for transmitting the recorded waveform data to a terminal unit located at a remote point through a communication line to display it on the terminal unit.

5. An industrial machine monitoring system according to claim 4, further comprising a feature that wherein said displaying means graphically displays a normal condition of the industrial machine which was preliminarily recorded as continuous time-series waveform data so that waveform data obtained under a certain operating condition can be compared to said waveform data of the normal condition and said displaying means has a diagnosis guidance screen for diagnosing an abnormal condition of the industrial machine by selecting a pre-stored waveform shape similar to the waveform data of said certain operating condition.

6. An industrial machine monitoring system according to claim 5, wherein said displaying means displays a diagnosis guidance which indicates the cause of an error and a way of tackling it, based on the result of the comparison between the waveform data of the normal condition and the waveform data of the certain operating condition.

7. A method for monitoring an industrial machine, in which an operating condition of an industrial machine is measured and recorded as a continuous time-series waveform data and said waveform data is processed to be graphically displayed on a screen of a terminal unit;
- wherein a normal condition of the industrial machine is preliminarily recorded as a continuous time-series waveform data and can be graphically displayed on the screen of the terminal unit, and waveform data obtained under a certain operating condition can be compared to the waveform data of the normal condition to grasp a trend of the waveform data of said certain operating condition.

8. A system for monitoring an industrial machine, comprising measuring means for measuring an operating condition of an industrial machine, recording means for recording data obtained from measurement by the measuring means as a continuous time-series waveform data, and displaying means for processing and graphically displaying the waveform data recorded by the recording means;
- wherein said displaying means graphically displays a normal condition of the industrial machine which was preliminarily recorded as a continuous time-series waveform data so that the waveform data obtained under a certain operating condition can be compared to said waveform data of the normal condition to grasp a trend of the waveform data of said certain operating condition.

9. A method for monitoring an industrial machine, in which an operating condition of an industrial machine is measured and recorded as a continuous time-series waveform data and said waveform data is processed to be graphically displayed on a screen of a terminal unit;
- wherein an normal condition of the industrial machine is preliminarily recorded as a continuous time-series waveform data and can be graphically displayed on the screen of the terminal unit, and waveform data obtained under a certain operating condition can be compared to the waveform data of the normal condition to grasp a trend of the waveform data of said certain operating condition;
- wherein a presently displayed screen can be switched to a diagnosis guidance screen for diagnosing an abnormal condition of the industrial machine, based on a result of the comparison between the waveform data of the normal condition and the waveform data of the certain operating condition; and
- wherein said presently displayed screen can be switched from said diagnosis guidance screen to a screen which designates a position where a failure has occurred.

10. A system for monitoring an industrial machine, comprising
- measuring means for measuring an operating condition of an industrial machine,
- recording means for recording data obtained from measurement by the measuring means as continuous time-series waveform data, and
- displaying means for processing and graphically displaying the waveform data recorded by the recording means;
- wherein said displaying means graphically displays a normal condition of the industrial machine which was preliminarily recorded as continuous time-series waveform data so that waveform data obtained under a certain operating condition can be compared to said waveform data of the normal condition to grasp a trend of the waveform data of said certain operating condition;
- wherein said displaying means displays a diagnosis guidance which indicates the cause of an error and a way of tackling it, based on the result of the comparison between the waveform data of the normal condition and the waveform data of the certain operating condition.

* * * * *